Nov. 22, 1960 F. C. SCHMIDT 2,961,503
TURN SIGNAL MECHANISM
Filed July 29, 1958 3 Sheets-Sheet 1

INVENTOR
FRANCIS C. SCHMIDT
BY Robert D. Sommer
AGENT

Nov. 22, 1960  F. C. SCHMIDT  2,961,503
TURN SIGNAL MECHANISM
Filed July 29, 1958  3 Sheets-Sheet 2

INVENTOR
FRANCIS C. SCHMIDT
BY
Robert D. Sommer
AGENT

Nov. 22, 1960   F. C. SCHMIDT   2,961,503
TURN SIGNAL MECHANISM
Filed July 29, 1958   3 Sheets-Sheet 3

INVENTOR
FRANCIS C. SCHMIDT

BY Robert D. Sommer

AGENT

United States Patent Office 2,961,503
Patented Nov. 22, 1960

2,961,503

TURN SIGNAL MECHANISM

Francis C. Schmidt, Logansport, Ind., assignor to Essex Wire Corporation, Fort Wayne, Ind.

Filed July 29, 1958, Ser. No. 751,687

4 Claims. (Cl. 200—61.34)

This invention relates to turn signal systems for motor vehicles and more particularly to manually set and automatically reset switch mechanisms associated with such systems.

Automotive vehicles such as passenger cars and trucks are now commonly equipped with a signalling mechanism for selectively energizing indicating lamps on the front and rear of the vehicle for indicating when a turn is to be made. Such signalling mechanism usually includes a switch for making the required circuit connections and a mechanical operating device for manual setting of the switch from a neutral position to different signal operating positions and for automatically returning the switch to the neutral position in response to rotation of the steering mechanism in a direction opposite that of the indicated turn. This invention is concerned with such a mechanism in which the switch is an integral part of the mechanical operating device.

One object of the present invention is to provide an improved turn signal mechanism of the above character which is of simple construction and few parts and which may be easily and inexpensively manufactured, yet is durable, dependable and quiet in operation.

Another object is to provide a turn signal mechanism which is entirely self-contained and readily installed upon the steering column of a motor vehicle.

A futher object is to provide a turn signal mechanism which is of compact size particularly adapted for installation in a limited annular space about the steering column of a vehicle adjacent the base of the steering wheel.

Still a further object is to provide a turn signal mechanism wherein the circuit controlling switch is an integral part of the mechanical operating device therefor.

Yet another object is to provide a turn signal mechanism wherein resilient resetting means are deflectable into a set position whereby the resilient means are easily by-passed when engaged in one direction and offer high resistance when engaged in the other direction, yet yield without damage to the turn signal mechanism in the event an obstruction or manual restraint interferes with the normal operation thereof.

Thes and other objects and advantages of the invention will be more fully apparent from the following description and accompanying drawings in which.

Figure 2:
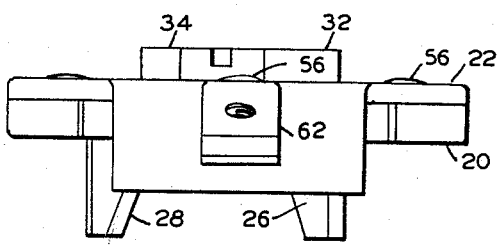
Figure 2 is an elevational view of the turn signal mechanism as seen from the left side of Figure 1, the operating handle being removed.
Figure 10:
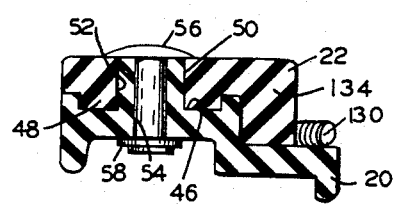
Figure 1:
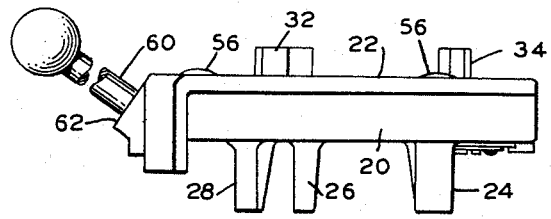
Figure 1 is an elevational view of a turn signal mechanism embodying the present invention.
Figure 11:
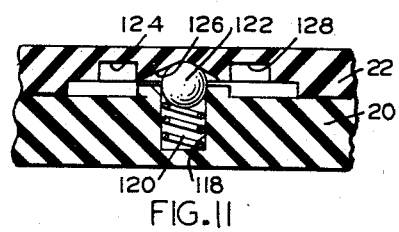
Figure 12:
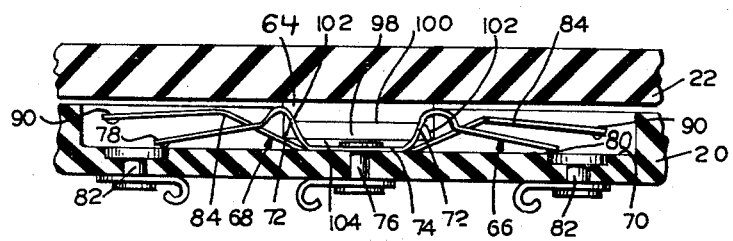
Figure 14:
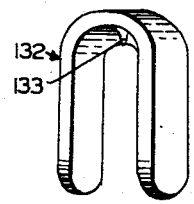
Figure 13:
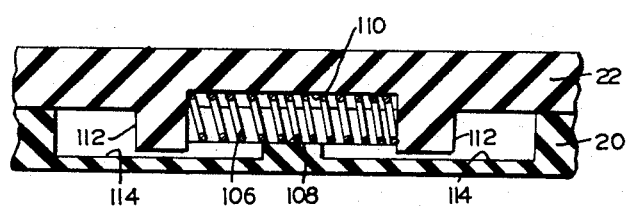
Figure 8:
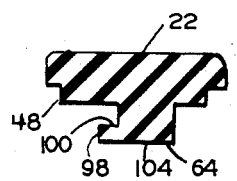
Figure 8 is an enlarged sectional view taken on the line 8—8 of Figure 6.
Figure 9:
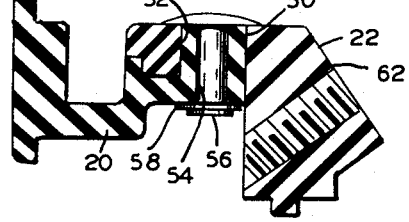
Figure 3:
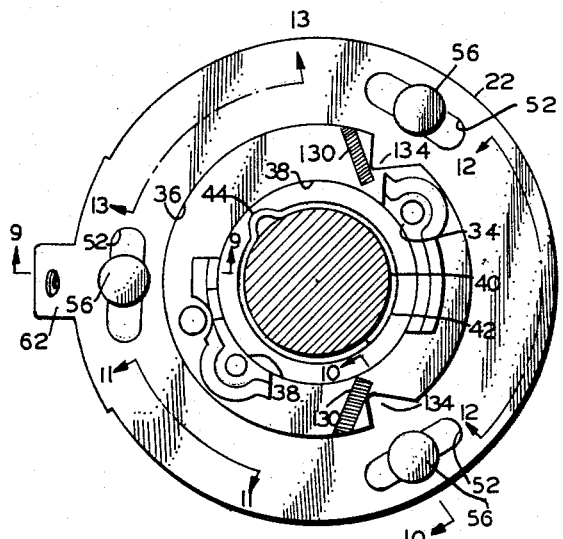
Figure 3 is a plan view of the turn signal mechanism as seen from the top of Figure 2, and showing a steering shaft in section and a cancelling cam carried by the steering shaft.

Figures 9, 10, 11, 12 and 13 are enlarged sectional views, respectively, taken substantially on the lines 9—9, 10—10, 11—11, 12—12 and 13—13 of Figure 3; and Figure 14 is an enlarged perspective view of a clip employed in the turn signal mechanism.

Referring now to the drawings, the turn signal mechanism is illustrated as comprising an annular body 20 and a concentrically disposed annular cover 22, both of which are formed of an insulating material such as a thermosetting resin. The body 20 may be supported upon the flanged upper end of a steering column (not shown) by means of short posts or stanchions 24, 26, 28 and 30 extending from the outer face of the body 20. The opposite face of body 20 may be similarly provided with projections 32 and 34 extending through opening 36 of cover 22 for supporting the operating parts of a horn switch. Body 20 also has a central opening 38 through which freely passes a vehicle steering shaft 40 carrying a clamp ring 42 having a projecting cancelling cam 44 movable with the steering shaft 40.

The inner face of body 20 is provided with a generally ring-shaped cavity 46 in which is rotatably received a corresponding cylindrical boss 48 projecting from the inner face of cover 22. Upstanding from the floor of cavity 46 are three cylindrical bosses 50 passing through arcuate slots 52 in the cover 22. Each of the bosses 50 has a central opening 54 through which extends a rivet 56 having one end staked over against a washer 58 disposed upon the outer face of body 20. For moving cover 22 relative to base 20, an actuating handle or arm 60 extends radially and laterally from its securement to shoulder 62 of cover 22.

The switch means for controlling energization and de-energization of the various circuits of the vehicle turn system may be of the type disclosed and claimed in U.S. Patent No. 2,900,460, granted on August 18, 1959, to Kenneth R. Wallace. The switch means include a contact actuator 64 depending from boss 48 diametrically opposite shoulder 62 and cooperating with a pair of contact springs 66 and 68, supported in cavity 70 of base 20. Contact spring 66 has a configuration substantially like that of an inverted W. A pair of spaced leg portions 72 extend from a web portion 74 which is held against the floor of cavity 70 by rivet 76. The outer ends of the legs 72 are reversely bent to define spring arms 78 each provided with a cup-like contact element 80 pressed outwardly from one side and normally bearing against the head of the cooperating contact rivet 82. Contact spring 68 is generally U-shaped and comprises a pair of spaced leg portions 84 extending from a web portion 86 which is held against the floor of cavity 70 by a rivet 88. Each leg of contact spring 68 has an extension 90 provided with two cup-like contact elements 92 and 94 overlying and normally separated from the heads of their respective cooperating contact rivets 82 and 96.

One side of the contact actuator 64 is recessed to provide a shoulder 98 having a deflecting surface 100 for actuating contact spring 66. Shoulder 98 has its ends rounded as at 102 and is disposed so that upon movement of actuator 64 away from the central position shown in Figure 12, deflecting surface 100 will engage a spring arm 78 of contact spring 66 and deflect it away from its cooperating contact rivet 82. Similarly, the under surface 104 of actuator 64 is adapted to engage a leg portion 84 of contact spring 68 and deflect its extension 90 toward its cooperating contacts 82 and 96 upon movement of the actuator from its central position. It will be apparent that upon rotation of cover 22 from a neutral position to an operating position where each boss 50 engages the one or the other end of its cooperating slot 52, contact springs 66 and 68 will be suitably deflected by actuator 64 to either their right or left turn signal circuit positions.

Cover 22 is normally centered on the base 20 in the position shown in Figure 3 by a coil spring 106 positioned in arcuate recesses 108 and 110, respectively, of base 20 and cover 22. Lugs 112 integrally formed upon boss 48 at either end of recess 110 project into arcuate slots 114 in the floor of cavity 46. Movement of cover 22 in either direction away from its neutral position compresses spring 106 between one of the lugs 112 and the opposite end wall 116 of recess 108 and thus yieldingly centers cover 22 in its neutral position.

To yieldably retain the cover 22 in its neutral position or either operating position, base 20 is provided with a hole 118 adapted to receive a spring 120 and a ball 122 which is yieldably urged by the spring 120 into engagement with any one of three arcuately arranged indentations 124, 126 and 128, which correspond to the right operating, neutral and left operating positions, respectively. The shape and depth of indentations 124, 126 and 128 are such that ball 122 has a greater detent action in indentations 124 and 128 than in indentation 126.

To provide means for automatic resetting of the cover from an operating position to the neutral position in response to rotation of the steering wheel, a pair of elongated helical springs 130 are secured to the inner face of the base 20 at opposite sides thereof by U-shaped clips 132 whose arms extend through base 20 and are bent over to firmly engage base 20. Springs 130 may be tightly coiled and are tubular in form with a diameter appreciably less than their length. To insure that helical springs 130 are firmly secured to the base 20, clips 132 may have an extrusion 133 pressed out from the clip as seen best in Figure 14. The free ends of the helical springs 130 normally extend near the periphery of opening 38 in the base 20 such that they are not engaged by cancelling cam 44 carried by the steering shaft 40. Cooperating with helical springs 130 is a pair of lugs 134 projecting from the inner periphery of opening 36 in cover 22 and adapted to engage and deflect helical springs 130 upon movement of cover 22 from its neutral position to its operating positions such that the end of one or the other of the helical springs 130 lies in the path of movement of cancelling cam 44.

Figure 4:
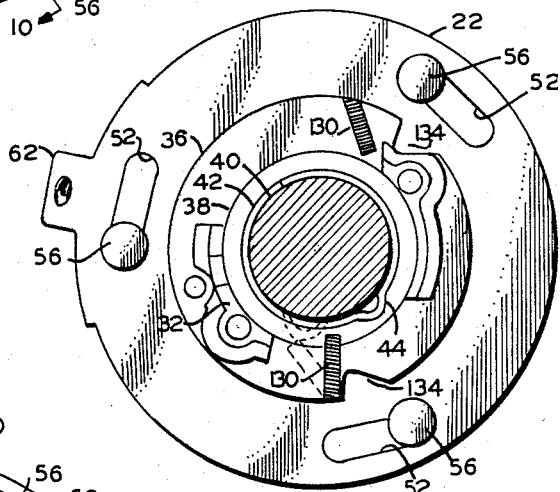
Figure 4 is a plan view similar to Figure 3, showing the turn signal mechanism in one of its operating positions.
Figure 5:
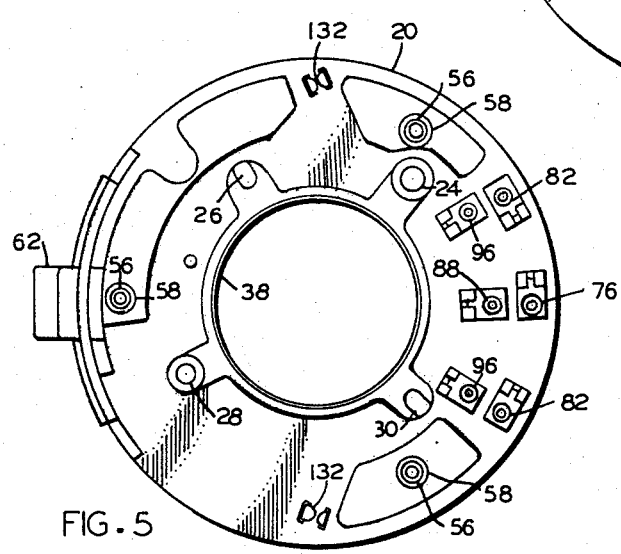
Figure 5 is a plan view of the turn signal mechanism as seen from the bottom of Figure 2.
Figure 6:
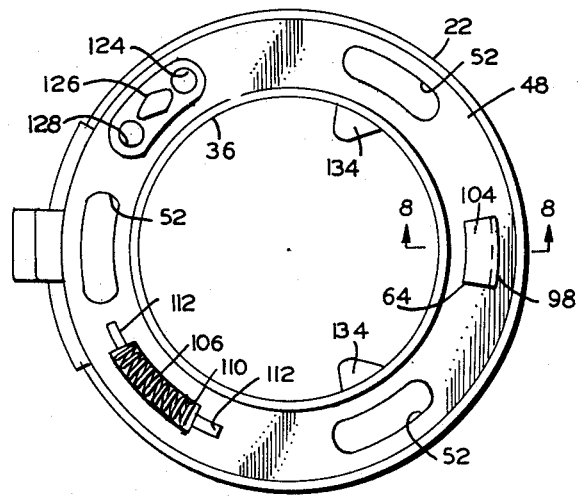
Figure 6 is a plan view within the turn signal mechanism with the fixed body member removed to show the movable cover member.
Figure 7:
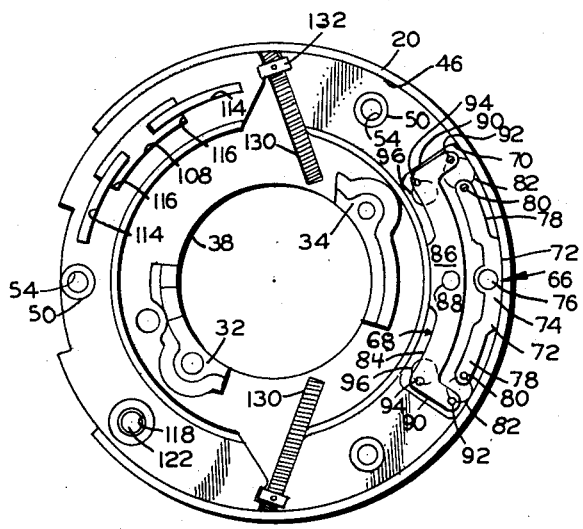
Figure 7 is a plan view within the turn signal mechanism with the movable cover member removed to show the fixed body member.

To signal a right turn, handle 60 is moved clockwise to rotate cover 22 from its neutral position shown in Figure 3 to its right turn operating position indicated in Figure 4. One of the lugs 134 moves away from its adjacent helical spring 130 while the other lug 134 deflects its adjacent helical spring 130 into the path of movement of cancelling cam 44. During clockwise movement of cover 22, ball 122 rides out of indentation 126 against the action of spring 120 and drops into the right turn indentation 124 to resiliently retain cover 22 in the right turn position.

With the mechanism in the position illustrated in Figure 4, when the steering shaft 40 is turned clockwise to make the desired right turn, cancelling cam 44 will engage the deflected helical spring 130 which is yieldably displaced as indicated by dotted lines in Figure 4. Such displacement offers little resistance to movement of the cancelling cam 44 because the helical spring 130 is free to bend along substantially its entire length. Upon reversal of rotation of the steering shaft 40 to return the vehicle to a straight ahead course, cancelling cam 44 will engage the opposite side of the helical spring 130. Because of the abutment of helical spring 130 against its adjacent lug 134, only a short extent of helical spring 130 is free to deflect. The resistance of that portion of helical spring 130 to rotation of cancelling cam 44 is substantially greater than the resilient holding effect of detent spring 120 and ball 122. Therefore, continued counter-clockwise rotation of steering shaft 40 moves cover 22, causing detent ball 122 to ride out of indentation 124, whereby spring 106 returns cover 22 to the neutral position. In the event an obstruction or manual restraint prevents movement of cover 22 to its neutral position, the short extent of helical spring 130 projecting beyond its abutting lug 134 will be displaced sufficiently by application of additional rotational force of cancelling cam 44 to permit cancelling cam 44 to pass. With a rotation of the operating handle 60 in a counter-clockwise direction to indicate a left turn, the operation of the turn signal mechanism obviously will be identical but in a reversed sense.

It will be noted from the above description of a preferred embodiment of the invention that a novel and highly simplified turn signal mechanism has been provided which is extremely compact, which operates smoothly at all times and is dependable in operation. Not only are substantially few parts required to accomplish all functions than has heretofore been possible, but in addition the need for critical alignment and adjustment in both assembly and installation is considerably reduced.

While the invention has been illustrated and described in its preferred embodiment and has included certain details, it should be understood that the invention is not to be limited to the precise details herein illustrated and described since the same may be carried out in other ways falling within the scope of the invention as claimed.

What is claimed is:

1. In a turn signal mechanism including rotatable cancelling cam means, the combination of a support; a ring-shaped operating member mounted upon the support for rotary movement about the axis of said rotatable cam means between a neutral position and switch operating positions at opposite sides of the neutral position; detent means for resiliently retaining the operating member in any of its adjusted positions; oppositely disposed cantilever springs carried by the support and having their free ends extending inwardly of the operating member; said cantilever springs comprising tubular tightly-coiled helical springs having a diameter appreciably less than their length; a pair of lugs upon the operating member, one lug positioned adjacent each cantilever spring; one of said lugs being positioned to deflect the free end of one of the cantilever springs into the path of the cam means when the operating member is adjusted to one of its switch operating positions; the other of said lugs being positioned to deflect the free end of the other cantilever spring into the path of the cam means when the operating member is adjusted to the other of its switch operating positions; said lugs being constructed and arranged to engage intermediate portions of said cantilever springs remote from the free ends thereof such that the free end of a deflected cantilever spring offers low resistance to movement of the cam means in one direction and high resistance to movement of the cam means in the opposite direction; and the portion of each cantilever spring intermediate its free end and the portion in engagement with a lug being bendable in the direction it offers high resistance to movement of the cam means.

2. In a turn signal mechanism including rotatable cancelling cam means, the combination of a support; an operating member arranged about the path of the cam means and movable relative to the support between a neutral position and switch-operating positions at opposite sides of the neutral position; oppositely disposed cantilever springs carried by the support and having their free ends extending in directions inwardly of the operating member; each of said cantilever springs being a tubular, tightly coiled helical spring having a diameter appreciably less than its length; lug means positioned on the operating member for engaging an intermediate portion of one cantilever spring remote from the free end thereof to deflect the free end of said one cantilever spring into the path of the cam means when the operating member is adjusted to one of its switch-closing positions; and said lug means being positioned on the operating member for engaging an intermediate portion of the other cantilever spring remote from the free end thereof to deflect the free end of said other cantilever spring into the path of the cam means when the operating member is adjusted to the other of its switch-operating positions.

3. A turn signal mechanism according to claim 2, wherein said support and said operating member have cooperating detent means for resiliently retaining the operating member in either of said operating positions; said lug means being effective when in engagement with either of said cantilever springs to decrease the normal resilience of the latter in one direction to less than the resilience of said detent means.

4. A turn signal mechanism according to claim 3, wherein said support and said operating member are constructed to define an enclosure for said detent means, for electric switch means, and for spring means which yieldably center said operating member in said neutral position.

References Cited in the file of this patent

UNITED STATES PATENTS

| | | |
|---|---|---|
| 2,702,327 | Redick | Feb. 15, 1955 |
| 2,722,577 | Barcus | Nov. 1, 1955 |
| 2,800,540 | Wagner | July 23, 1957 |
| 2,800,541 | Brown et al. | July 23, 1957 |
| 2,800,542 | Barcus et al. | July 23, 1957 |
| 2,824,180 | Carver | Feb. 18, 1958 |
| 2,848,573 | Barcus | Aug. 19, 1958 |
| 2,902,556 | Dryer | Sept. 1, 1959 |